United States Patent
Kimura et al.

(10) Patent No.: US 12,309,002 B2
(45) Date of Patent: May 20, 2025

(54) METHODS AND DEVICES FOR ESTIMATING A FREQUENCY DEVIATION

(71) Applicant: FURUNO ELECTRIC CO., LTD., Hyogo (JP)

(72) Inventors: Daisuke Kimura, Ashiya (JP); Yusuke Toyoda, Amagasaki (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 68 days.

(21) Appl. No.: 18/352,126

(22) Filed: Jul. 13, 2023

(65) Prior Publication Data

US 2023/0362035 A1    Nov. 9, 2023

Related U.S. Application Data

(63) Continuation-in-part of application No. PCT/JP2022/000458, filed on Jan. 11, 2022.

(30) Foreign Application Priority Data

Feb. 15, 2021 (JP) ................. 2021-021994

(51) Int. Cl.
*H04B 3/46* (2015.01)
*H04L 25/02* (2006.01)

(52) U.S. Cl.
CPC ................. *H04L 25/0222* (2013.01)

(58) Field of Classification Search
CPC .................................. H04L 25/0222
(Continued)

(56) References Cited

U.S. PATENT DOCUMENTS 7,746,178 B1 * 6/2010 Humphreys ............ H03L 7/085
                                                              331/25
9,160,588 B2    10/2015 Shibata
(Continued)

FOREIGN PATENT DOCUMENTS

JP    2010-278622 A    12/2010
JP    2014-027530 A     2/2014
(Continued)

OTHER PUBLICATIONS

International Search Report issued in PCT/JP2022/000458; mailed Mar. 29, 2022.
(Continued)

*Primary Examiner* — Zewdu A Kassa
(74) *Attorney, Agent, or Firm* — Studebaker Brackett PLLC

(57) ABSTRACT

The present disclosure provides a frequency deviation estimation device for estimating a frequency deviation upon receiving a digitally modulated non-repetitive signal. The frequency deviation estimation device is equipped with an instantaneous frequency measurement module, a minimum frequency detection module, and a frequency deviation calculation module. The instantaneous frequency measurement module measures the instantaneous frequency of the received communication signal. The minimum frequency detection module detects the minimum frequency of the instantaneous frequency. The frequency deviation calculation module calculates the frequency deviation between the received communication signal and the reference signal for coarse adjustment using the reference minimum frequency and the minimum frequency when the frequency deviation is zero Hertz.

18 Claims, 7 Drawing Sheets

(58) Field of Classification Search
USPC ............................. 375/224, 219, 295, 316
See application file for complete search history.

(56) References Cited

U.S. PATENT DOCUMENTS

| | | | | |
|---|---|---|---|---|
| 2014/0112378 A1* | 4/2014 | Ji | ........................ | H04L 27/266 375/344 |
| 2019/0312634 A1 | 10/2019 | Fourtet et al. | | |

FOREIGN PATENT DOCUMENTS

| | | |
|---|---|---|
| JP | 2015-142287 A | 8/2015 |
| JP | 2019-165385 A | 9/2019 |

OTHER PUBLICATIONS

Minoru Inomata et al., "Study of an OFDM Receivers for an Ideal Software Defined Radio," C-2-125, Proceedings of the Institute of Electronics, Information and Communication Engineers (IEICE) General Conference 2010, Mar. 16-19, 2010, p. 168.

The extended European search report issued by the European Patent Office on Jan. 24, 2025, which corresponds to European Patent Application No. 22752491.5, and is related to U.S. Appl. No. 18/352,126.

* cited by examiner

| RU | SW | LCID | DS | RD | GD |

RU : RAMP-UP  
SW : SYNCWORD  
LCID : LINK CONFIG ID  
DS : DATA SYMBOL  
RD : RAMP-DOWN  
GD : GUARD TIME

METHODS AND DEVICES FOR ESTIMATING A FREQUENCY DEVIATION

CROSS-REFERENCE TO RELATED APPLICATION(S)

This application is a continuation-in-part of PCT International Application No. PCT/JP2022/000458, which was filed on Jan. 11, 2022, and which claims priority to Japanese Patent Application No. 2021-021994 filed on Feb. 15, 2021, the entire disclosures of each of which are herein incorporated by reference for all purposes.

TECHNICAL FIELD

The present disclosure generally relates to frequency deviation estimation techniques and, more particularly, relates, to methods and devices for estimating a frequency deviation for a digitally modulated signal.

BACKGROUND

Frequency modulation is a process of encoding information in a carrier wave by varying the instantaneous frequency of the wave, for transmission of the information to remote receiver through the carrier wave. Frequency modulation can be analog or digital modulation and is used in various fields, for example, telecommunications, radio broadcasting, signal processing, and computing. In analog frequency modulation of an analog signal (e.g., audio signal), the instantaneous frequency deviation, that is, the difference between the frequency of the carrier and the center frequency, has a functional relation to the modulating signal amplitude. In digital frequency modulation, data can be encoded and transmitted with a type of frequency modulation (e.g., Frequency-Shift Keying (FSK)) for example, in which the instantaneous frequency of the carrier is shifted among a set of frequencies. Once received at the receiver, the frequency modulated signal needs to be demodulated to extract the information from the signal.

In Proceedings of the Institute of Electronics, Information and Communication Engineers (IEICE) General Conference 2010, by Minoru Inomata, et al, a study of an Orthogonal Frequency-Division Multiplexing (OFDM) receiver for an ideal software-defined radio is disclosed. A coarse frequency adjustment circuit is used while demodulating a digitally modulated Radio Frequency (RF) signal. The frequency is coarsely adjusted when demodulating the RF signal. It is noted that the signal used for coarse adjustment is a repetitive signal. However, if the signal used for coarse adjustment is non-repetitive in nature, then it becomes difficult to estimate the frequency, and consequently, a range of a frequency deviation.

Therefore, there exists a need for a method or device for estimating the frequency deviation of a non-repetitive signal.

SUMMARY

In order to solve the foregoing problem and to provide other advantages, one aspect of the present disclosure is to estimate a frequency deviation of a non-repetitive signal. A frequency deviation estimation device includes an instantaneous frequency measurement module configured to measure an instantaneous frequency of a received communication signal. The frequency deviation estimation device also includes a minimum frequency detection module configured to detect a minimum frequency of the instantaneous frequency. The frequency deviation estimation device also includes a frequency deviation calculation module configured to calculate a frequency deviation between the received communication signal and a reference signal for coarse adjustment. The frequency deviation is calculated using the minimum frequency of the instantaneous frequency and a reference minimum frequency when the frequency deviation is zero Hertz.

An advantage of various embodiments is that the frequency deviation of the digitally modulated non-repetitive signal can be easily and reliably estimated for coarse adjustment.

In an aspect, the frequency deviation calculation module includes a frequency difference calculation module and a frequency deviation determination module. The frequency difference calculation module is configured to calculate a difference in frequency (hereinafter referred to as 'frequency difference') between the reference minimum frequency and the minimum frequency. The frequency deviation determination module is configured to determine the frequency deviation using the frequency difference.

In an aspect, the frequency deviation estimation device further includes a filter module. The filter module is configured to perform a filtering process by filtering the minimum frequency of a plurality of intervals. The frequency deviation calculation module is further configured to calculate the frequency deviation using the minimum frequency filtered by the filter module.

In an aspect, the filter module is further configured to set a median frequency of the minimum frequency of the plurality of intervals as the minimum frequency, after performing the filtering process.

In an aspect, the filter module is further configured to calculate a plurality of moving average frequencies after performing a moving average processing on the minimum frequency of the plurality of intervals.

In an aspect, the filter module is further configured to set a median frequency of a plurality of moving average frequencies as the minimum frequency after performing the filtering process.

In an aspect, the instantaneous frequency measurement module is further configured to measure the instantaneous frequency of a preamble of the received communication signal for communication control. The preamble of the received communication signal consists of non-repetitive data.

Another aspect of the present disclosure is to provide a frequency deviation estimation method that includes measuring the instantaneous frequency of the received communication signal. The method further includes detecting the minimum frequency of the instantaneous frequency. The method further includes calculating the frequency deviation between the received communication signal and the reference signal for coarse adjustment. The frequency deviation is calculated using the reference minimum frequency and the minimum frequency when the frequency deviation is zero Hertz.

In an aspect, the method further includes calculating the frequency difference between the reference minimum frequency and the minimum frequency and determining the frequency deviation using the frequency difference.

In an aspect, the method further includes performing a filtering process by filtering the minimum frequency of the plurality of intervals and calculating the frequency deviation using the minimum frequency filtered by the filter module.

In an aspect, the method further includes setting the median frequency of the minimum frequency of the plurality of intervals as the minimum frequency after performing the filtering process.

In an aspect, the method further includes calculating the plurality of moving average frequencies after performing a moving average processing on the minimum frequency of the plurality of intervals.

In an aspect, the method further includes setting the median frequency of the plurality moving averages as the minimum frequency after performing the filtering process.

In an aspect, the method further includes measuring the instantaneous frequency of the preamble of the received communication signal for communication control, the preamble of the received communication signal consists of the non-repetitive data.

In an aspect, the method further includes receiving the reference generation signal with the frequency deviation of zero Hertz. The method further includes detecting the minimum frequency of the instantaneous frequency of the reference generation signal. Further, the method includes storing the minimum frequency of the instantaneous frequency of the reference generation signal as the reference minimum frequency and calculating the frequency deviation from the communication signal using the stored reference minimum frequency.

The foregoing summary is illustrative only and is not intended to be in any way limiting. In addition to the illustrative aspects, embodiments, and features described above, further aspects, embodiments, and features will become apparent by reference to the drawings and the following detailed description.

Effect(s)

The present disclosure provides devices and methods for estimating a frequency deviation upon receiving a digitally modulated signal. Using the present disclosure, the frequency deviation can be easily estimated for non-repetitive signals.

The frequency deviation estimation device of the present disclosure is equipped with an instantaneous frequency measurement module, a minimum frequency detection module, and a frequency deviation calculation module. The instantaneous frequency measurement module measures the instantaneous frequency of the received communication signal. The minimum frequency detection module detects the minimum frequency of the instantaneous frequency. Using the minimum frequency of the instantaneous frequency and the reference minimum frequency when the frequency deviation is zero Hertz, the frequency deviation calculation module calculates the frequency deviation between the received communication signal and the reference signal for coarse adjustment. Thus, the frequency deviation estimation device can easily and accurately estimate the frequency deviation for non-repetitive signals.

BRIEF DESCRIPTION OF THE DRAWINGS

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device, or a tool and instrumentalities disclosed herein. Moreover, those skilled in the art will understand that the drawings are not to scale.

FIG. 3 illustrates an example data configuration of a signal for the AIS, in accordance with an embodiment of the present disclosure;

FIG. 4 illustrates a bit array of Syncword (SW) data, in accordance with an embodiment of the present disclosure;

Figure 1:
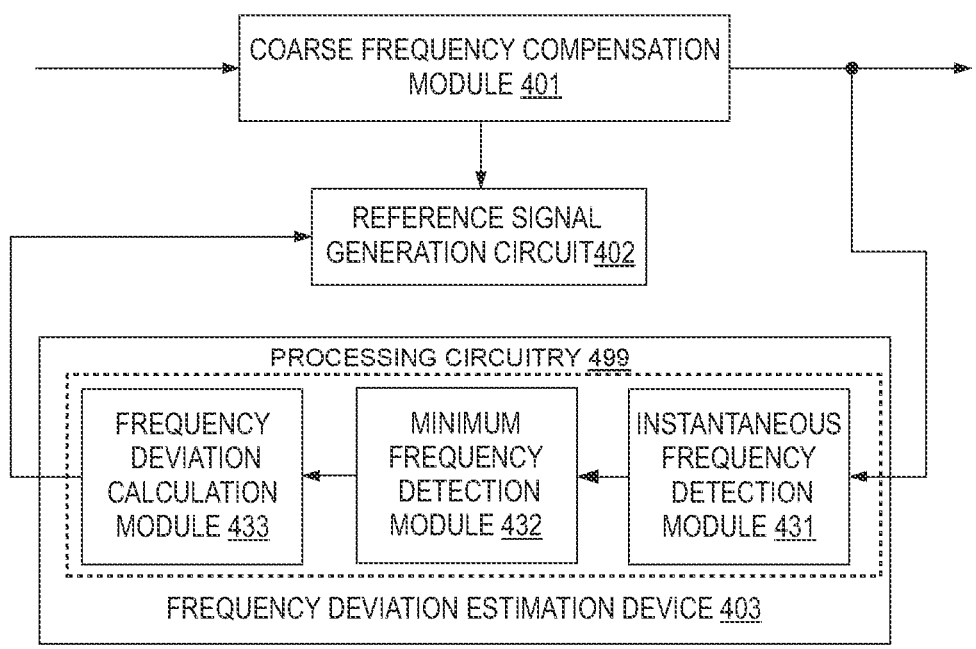
FIG. 1 illustrates a functional block diagram of a coarse frequency control module including a frequency deviation estimation device, in accordance with an embodiment of the present disclosure.

The drawings referred to in this description are not to be understood as being drawn to scale except if specifically noted, and such drawings are only exemplary in nature.

DETAILED DESCRIPTION OF THE DISCLOSURE

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments described herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores, or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements, or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

Various embodiments of the present disclosure relate to a frequency deviation estimation device for a non-repetitive signal. The frequency deviation estimation device of the present disclosure is equipped with an instantaneous frequency measurement module, a minimum frequency detection module, and a frequency deviation calculation module. The instantaneous frequency measurement module measures the instantaneous frequency of the received communication signal. The minimum frequency detection module detects the minimum frequency of the instantaneous frequency. Using the minimum frequency of the instantaneous frequency and the reference minimum frequency when the frequency deviation is zero Hertz, the frequency deviation calculation module calculates the frequency deviation between the received communication signal and the reference signal for coarse adjustment. Various embodiments of the present disclosure are described hereinafter with reference to FIG. 1 to FIG. 9.

FIG. 1 illustrates a functional block diagram of a coarse frequency control module 41 including a frequency deviation estimation device 403, in accordance with an embodiment of the present disclosure. As shown in FIG. 1, the coarse frequency control module 41 includes a coarse frequency compensation module 401, a reference signal generation circuit 402, and the frequency deviation estimation device 403. The functional blocks in FIG. 1 except the frequency deviation estimation device 403, other functional blocks are the same as or similar to an Automatic Identification System (AIS) in the conventional (Universal Shipborne) system, and therefore they are not described for the sake of brevity. As shown in FIG. 1, the frequency deviation estimation device 403 includes an instantaneous frequency measurement module 431, a minimum frequency detection module 432, and a frequency deviation calculation module 433.

Figure 2:
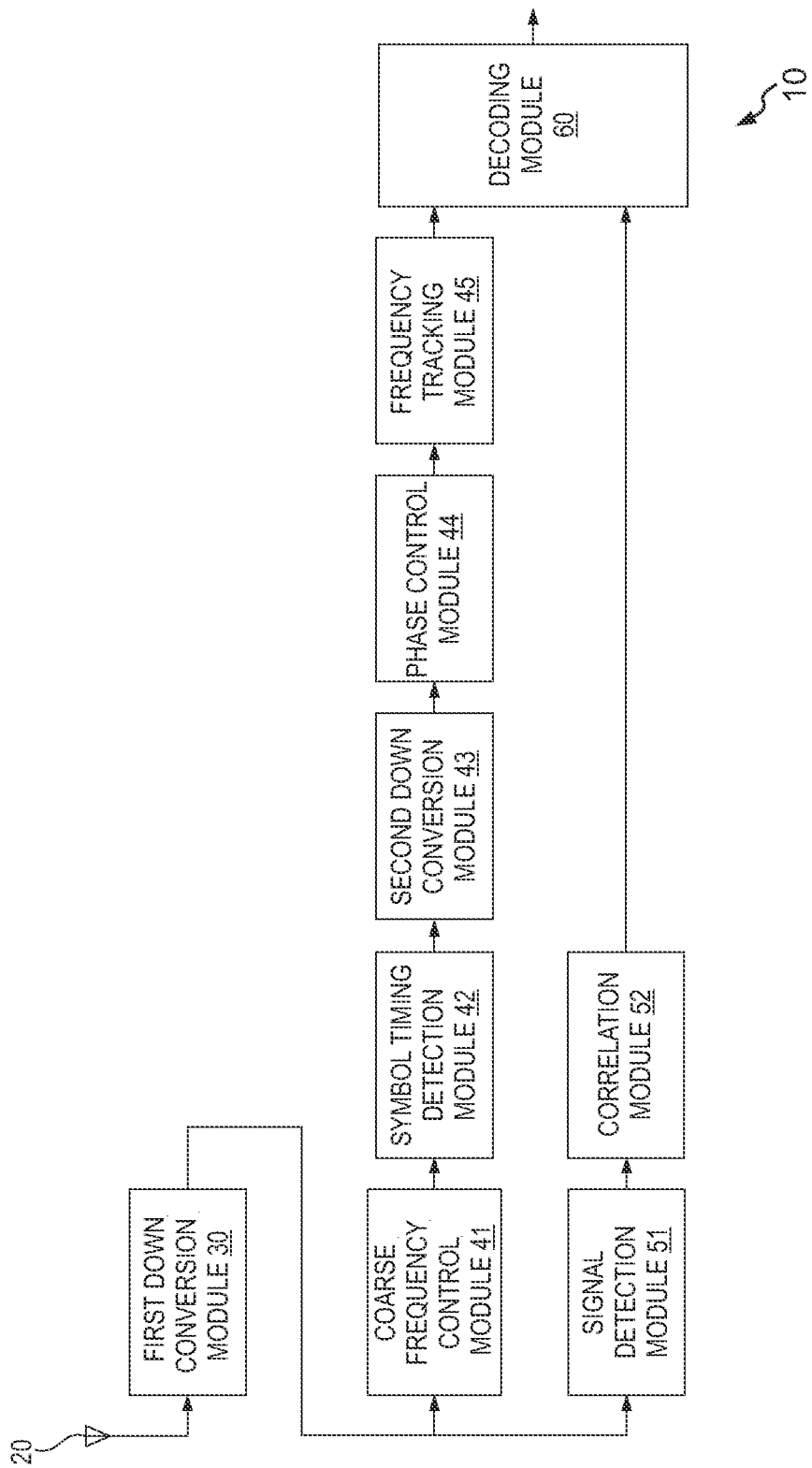
FIG. 2 illustrates a functional block diagram of a functional block diagram of an Automatic Identification System (AIS) for a ship, in accordance with an embodiment of the present disclosure.

FIG. 2 illustrates a functional block diagram of the AIS 10 for a ship, in accordance with an embodiment of the present disclosure. As shown in FIG. 2, the AIS 10 for the ship includes an antenna 20, a first down conversion module 30, the coarse frequency control module 41, a symbol timing detection module 42, a second down conversion module 43, a phase control module 44, a frequency tracking module 45, a signal detection module 51, a correlation module 52, and a decoding module 60. Each module of the AIS 10 for the ship, except the antenna 20 can be realized as an analog circuit, a digital circuit, an arithmetic processing unit such as a computer, etc.

The antenna 20 receives a signal, for example, an automatic ship identification signal, and outputs the received signal to the first down conversion module 30. The first down converter 30 converts the received signal to a predetermined multiple frequency of a baseband signal. In a non-limiting example, the frequency is ten times the frequency of the baseband signal. The first down converter 30 outputs the down-converted received signal to the coarse frequency control unit 41 and the signal detection unit 51.

The coarse frequency control module 41 estimates and calculates the frequency deviation from the received signal and performs coarse control of the frequency. By the processing of the coarse frequency control module 41, for example, the frequency of the reference signal is driven from a range of +/−500 Hertz to a range of +/−30 Hertz relative to the frequency of the received signal.

The symbol timing detection module 42 detects a symbol timing of the received signal after the coarse control output from the coarse frequency control module 41. The second down converter 43 down-converts the output signal of the symbol timing detection module 42 to a baseband frequency. The phase control module 44 then performs an automatic phase control on the down-converted output signal to the baseband, for example, the baseband signal.

The frequency tracking module 45 performs automatic phase control and automatic frequency control with higher accuracy on the baseband signal output from the phase control module 44. This forces the frequency of the reference signal from a range of +/−500 Hertz to a range of +/−30 Hertz relative to the frequency of the received signal. Therefore, convergence to the desired symbol point can be achieved with high accuracy. The frequency tracking module 45 outputs the signal, for example, a demodulated signal, after the automatic phase control and the automatic frequency control, to the decoding module 60.

The signal detection module 51 detects the Ramp-Up (RU) data of the received signal. The correlation module 52 uses the timing of the RU data to correlate the received signal with the reference code for peak detection. The reference code refers to data having the same bit configuration as that of the Sync Word (SW) data. By this processing, the peak-detected correlation data from the correlation module 52 is converted to the data representing slot timing. The data representing slot timing refers to a timing of peak detection of the correlation data.

Using the demodulation signal and the timing of peak detection of the correlation data, the decoding module 60 decodes data including various information for the AIS 10, such as a ship identification (ID) from the Data Symbol (DS) data.

The coarse frequency control module 41 depicted in FIG. 1 is used in the coarse frequency control module 41 and includes without limitation, the coarse frequency compensation module 401, the reference signal generation circuit 402, and the frequency deviation estimation device 403. Broadly speaking, the frequency deviation estimation device 403 estimates and calculates the frequency deviation between the received signal and the reference signal, and outputs it to the reference signal generation circuit 402. The reference signal generation circuit 402 is equipped with a Voltage-Controlled Oscillator (VCO), a pulse generation module, etc., adjusts the reference signal according to the frequency deviation, and outputs it to the coarse frequency compensation module 401. The coarse frequency compensation module 401 uses the reference signal to perform the coarse tuning of the frequency relative to the received signal.

FIG. 3 illustrates an example data configuration of a signal for the AIS 10 for the ship, in accordance with an embodiment of the present disclosure. The signal for automatic identification of ships is composed of RU data, SW data, Link Config Identity (LCID) data, DS data, Ramp-Down (RD) data, and Guard time Data (GD).

RU data represents a beginning of data of the AIS ([Universal Shipborne] Automatic Identification System) signal. SW data is for timing detection and frequency control. LCID data represents a modulation method of DS data. DS data includes various information for the AIS 10 such as ship identification ID. RD data is for AIS signals, more specifically, data representing the end of DS data. The GD is a time interval left vacant, having no signal or data, during which no data is sent. The SW data corresponds to a "preamble" of the received signal. In computer networks, the syncword, sync character, sync sequence, or preamble is used to synchronize data transmission by indicating the end of header information and the start of data.

The signal is arranged in the order of RU data, SW data, LCID data, DS data, RD data, and GD data. Each of the RU data, the SW data, the LCID data, the DS data, and the RD has a prescribed number of bits, and each is modulated by a prescribed modulation method. The prescribed modulation method may include but is not limited to Quadrature Phase Shift Keying (QPSK), 8 Phase-Shift Keying (PSK), 16 Quadrature amplitude modulation (QAM), etc. FIG. 4 illustrates a bit array of SW data, in accordance with an embodiment of the present disclosure. As shown in FIG. 4, SW data is not repetitive, for example, 1, 1, 1, 1, 1, 1, 0, 0, 1, 1, and so on. Repetitiveness is a property of data in which a bit or group of bits of 1 and a bit or group of bits of 0 are repeated in a fixed period. In SW data a bit or group of bits of 1 and a bit or group of bits of 0 are not repeated. In the case of SW data with such non-repetitiveness, it is difficult to estimate the frequency and the frequency deviation in a conventional coarse frequency control circuit. The present disclosure uses the frequency deviation estimation device for calculating the frequency deviation. The frequency deviation is the difference between the frequency of the received signal and the frequency of the reference signal for frequency control. In one embodiment, the reference signal for frequency control refers to a station signal of the AIS 10 for the ship.

Figure 5:
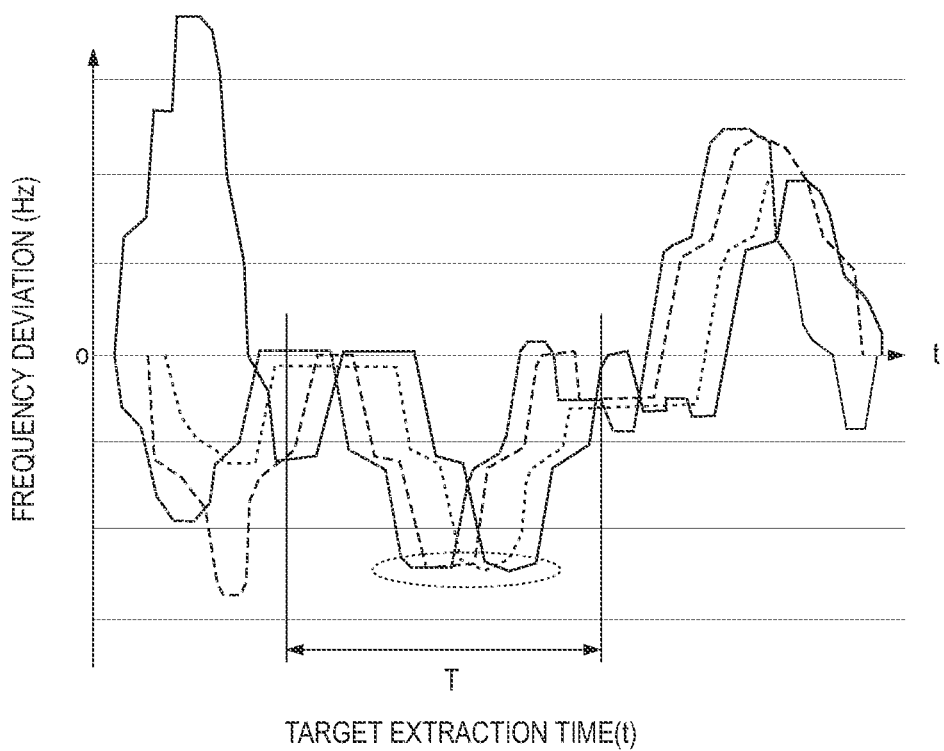
FIG. 5 illustrates a graph showing an example of the frequency deviation between an instantaneous frequency and a reference frequency, in accordance with an embodiment of the present disclosure.

FIG. 5 illustrates a graph showing an example of the frequency deviation between an instantaneous frequency and a reference frequency, in accordance with an embodiment of the present disclosure. The reference frequency is the frequency of the ship's automatic identification signal in the uncoded-modulated state. In FIG. 5, the vertical axis shows the frequency deviation (in Hertz) of the instantaneous frequency from the reference frequency, and the horizontal axis shows the time (t). The solid line, the dashed line, the dot-dash line, and the dot-dot-dash line have different reception sensitivities.

As shown in FIG. 5, the instantaneous frequency varies depending on the measurement timing and the reception sensitivity. Also, due to the non-repetitiveness of the SW data, there is no periodic timing when the frequency deviation becomes zero Hertz. Furthermore, the timing when the frequency deviation becomes zero Hertz also varies depending on the reception sensitivity and is not always constant.

On the other hand, the timing (T) when the instantaneous frequency becomes minimum (the timing when the frequency deviation becomes minimum) is within a certain time range and is almost the same regardless of the reception sensitivity. Therefore, by detecting the minimum frequency of the instantaneous frequency, the frequency deviation can be easily and more reliably estimated.

Although not shown, the magnitude of the minimum frequency of the instantaneous frequency depends on the frequency difference (the frequency deviation) between the received signal and the reference signal. Therefore, the frequency deviation can be estimated by using the minimum frequency of the instantaneous frequency. Using this principle, a frequency deviation estimation device 403 estimates the frequency deviation.

More specifically, as shown in FIG. 1, the frequency deviation estimation device 403 includes the instantaneous frequency measurement module 431, the minimum frequency detection module 432, and the frequency deviation calculation module 433. The instantaneous frequency measurement module 431 measures the instantaneous frequency of the received signal. More specifically, the instantaneous frequency measurement module 431 measures the instantaneous frequency of SW data of the received signal at a predetermined time interval. The predetermined time interval is, for example, a time interval corresponding to a predetermined time of 1 bit or less of the AIS signal. This time interval is not limited to a predetermined time of 1 bit or less, and may be a time of a plurality of bits, but by making it a predetermined time of 1 bit or less, the number of samples of the instantaneous frequency can be increased and it is more effective. The instantaneous frequency measurement module 431, the minimum frequency detection module 432, and the frequency deviation calculation module 433 can be realized by an arithmetic processing unit or processing circuitry 499 such as a personal computer or a dedicated electronic circuit.

The minimum frequency detection module 432 detects the minimum frequency of the instantaneous frequency at a plurality of times. At this time, the minimum frequency detection module 432 detects the minimum frequency of a plurality of instantaneous frequencies after a predetermined time and during a predetermined period from the measurement start timing of the instantaneous frequency.

As described above, the time when the instantaneous frequency becomes minimum is approximately present within a predetermined time range regardless of reception sensitivity. Therefore, the detection target interval is set as shown in FIG. 5. The detection target interval can be set from the time characteristics of the instantaneous frequency shown in FIG. 5, which are acquired in advance. The minimum frequency detection module 432 detects the minimum frequency of the instantaneous frequency within the detection target interval. With this, the minimum frequency of the instantaneous frequency can be detected more reliably and accurately.

Figure 6:
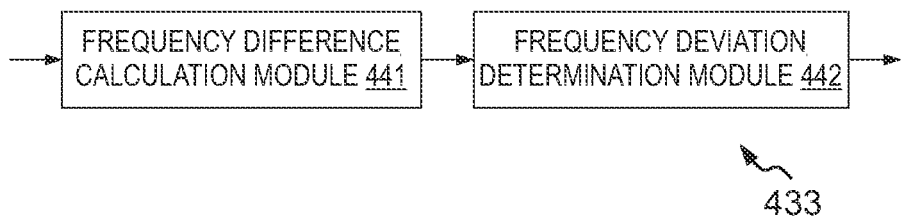
FIG. 6 illustrates a functional block diagram of the frequency deviation calculation module, in accordance with an embodiment of the present disclosure.

FIG. 6 illustrates a functional block diagram of the frequency deviation calculation module 433, in accordance with an embodiment of the present disclosure. As shown in FIG. 6, the frequency deviation calculation module 433 includes a frequency difference calculation module 441 and a frequency deviation determination module 442. The frequency deviation calculation module 433 calculates the frequency deviation using the minimum frequency of the instantaneous frequency and the reference minimum frequency.

The frequency difference calculation module 441 calculates a frequency difference between the minimum frequency of the instantaneous frequency and the reference minimum frequency. The reference minimum frequency corresponds to the minimum frequency of the instantaneous frequency for the received signal whose frequency deviation is zero Hertz.

The reference minimum frequency can be set, for example, by sending a signal with a frequency deviation of zero Hertz, to the AIS 10 for the ship. For the signal with a frequency deviation of zero Hertz, the instantaneous frequency is measured at a plurality of timings as described above. The minimum of a plurality of instantaneous frequencies is detected. This minimum is set to the reference minimum.

The frequency deviation determination module 442 determines the frequency deviation using the frequency difference. For example, the frequency deviation determination module 442 directly determines the frequency difference as the frequency deviation. Thus, the frequency deviation is easily and reliably estimated and calculated.

The frequency deviation determination module 442 sets a relationship between the frequency difference and the frequency deviation in advance, and the frequency deviation may be calculated from the frequency difference using this relationship. The frequency deviation determination module 442 also stores the relationship between the frequency difference and the frequency deviation in a database in advance, and the frequency deviation may be calculated from the frequency difference using this database. By using these methods, the relationship between the frequency difference and the frequency deviation can be set more variously, and the frequency deviation can be determined more reliably and more accurately.

As described above, by having the configuration of the present embodiment, the frequency deviation estimation device 403 can easily estimate the frequency deviation for non-repetitive signals. Moreover, the frequency deviation estimation device 403 can estimate the frequency deviation more accurately.

In this configuration, a detection target interval is set to detect the minimum frequency. Thus, even if the measurement timing varies, the minimum frequency can be detected more reliably. Therefore, the frequency deviation estimation device 403 can more reliably estimate the frequency deviation.

Figure 7:
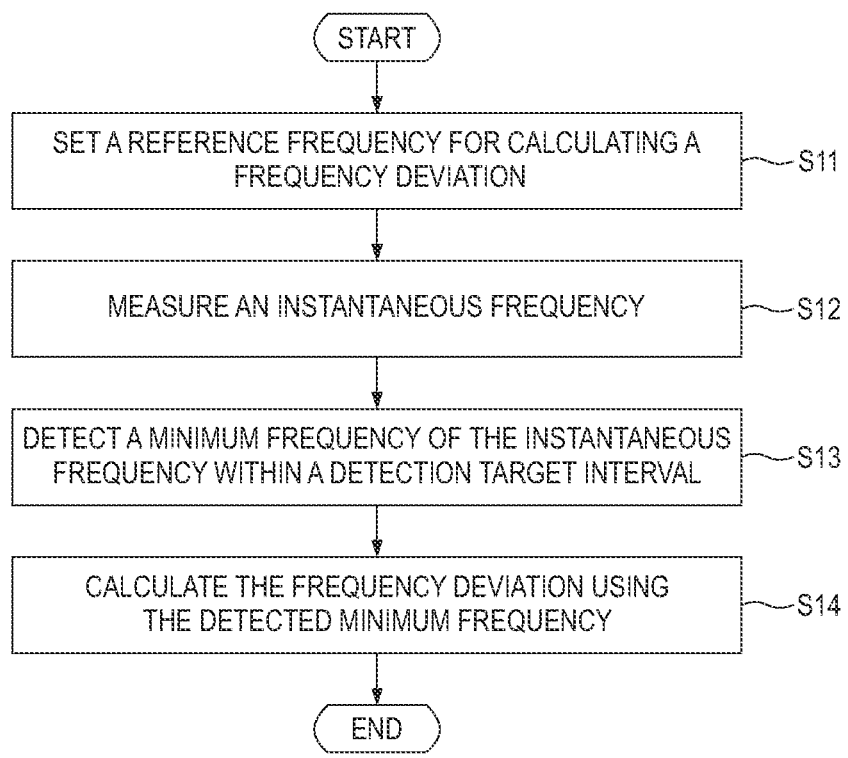
FIG. 7 illustrates a flow diagram of a method for estimating a frequency deviation, in accordance with an embodiment of the present disclosure.

FIG. 7 illustrates a flow diagram of a method for providing a frequency deviation estimation, in accordance with an embodiment of the present disclosure. Steps of the flow diagram of the method of FIG. 7, and combinations of the steps in the flow diagram of the method of FIG. 7, may be implemented by, for example, hardware, firmware, a processor, circuitry, and/or a different device associated with the execution of software that includes one or more computer program instructions. The sequence of steps of the method of FIG. 7 may not be necessarily executed in the same order as they are presented. Further, one or more steps may be grouped and performed in the form of a single step, or one step may have several sub-steps that may be performed in a parallel or a sequential manner. The method of FIG. 7 starts at step S11.

In the specific contents of each process of the flowchart shown in FIG. 7, each module described by the explanation of FIG. 1-6 is omitted in the description of FIG. 7.

At step S11, the method of FIG. 7 includes setting the reference frequency for calculating the frequency deviation using the frequency deviation estimation device 403. The reference frequency for calculation is, for example, the reference minimum frequency described in reference to FIG. 6.

At step S12, the method of FIG. 7 includes measuring the instantaneous frequency using the frequency deviation estimation device 403.

At step S13, the method of FIG. 7 includes detecting the minimum frequency of the instantaneous frequency within the detection target interval using the frequency deviation estimation device 403.

At step S14, the method of FIG. 7 includes calculating the frequency deviation, by the frequency deviation estimation device 403 using the detected minimum frequency (S14).

Figure 8:
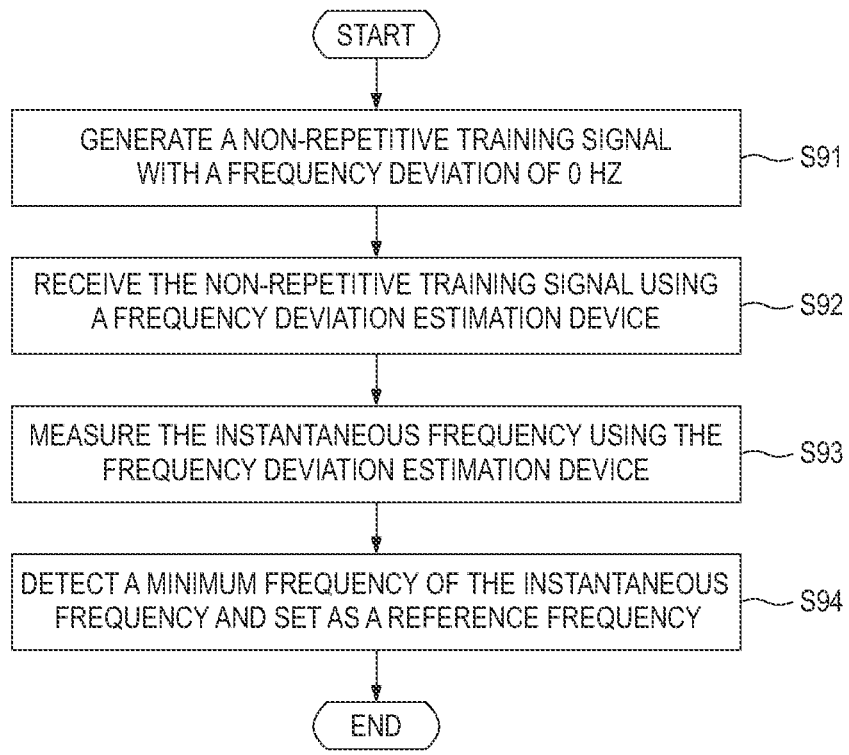
FIG. 8 illustrates a flow diagram of a method for calculating a reference frequency, in accordance with an embodiment of the present disclosure.

FIG. 8 illustrates a flow diagram of a method for providing a calculation of the reference frequency for calculating the frequency deviation, in accordance with an embodiment of the present disclosure. The reference frequency for calculating the frequency deviation is set, for example, by the method shown in FIG. 8. The method of FIG. 8 starts at step S91.

At step S91, the method of FIG. 8 includes generating a non-repetitive training signal with a frequency deviation of zero Hertz. The training signal has the same bit sequence as the SW data of the AIS signal.

At step S92, the method of FIG. 8 includes receiving the non-repetitive training signal using the frequency deviation estimation device 403.

At step S93, the method of FIG. 8 includes measuring the instantaneous frequency using the frequency deviation estimation device 403.

At step S94, the method of FIG. 8 includes detecting the minimum frequency of the instantaneous frequency and setting it as a reference frequency for calculation, using the frequency deviation estimation device 403. The frequency deviation estimation device 403 sets the detection target interval and preferably detects the instantaneous minimum frequency in the detection target interval.

Figure 9:
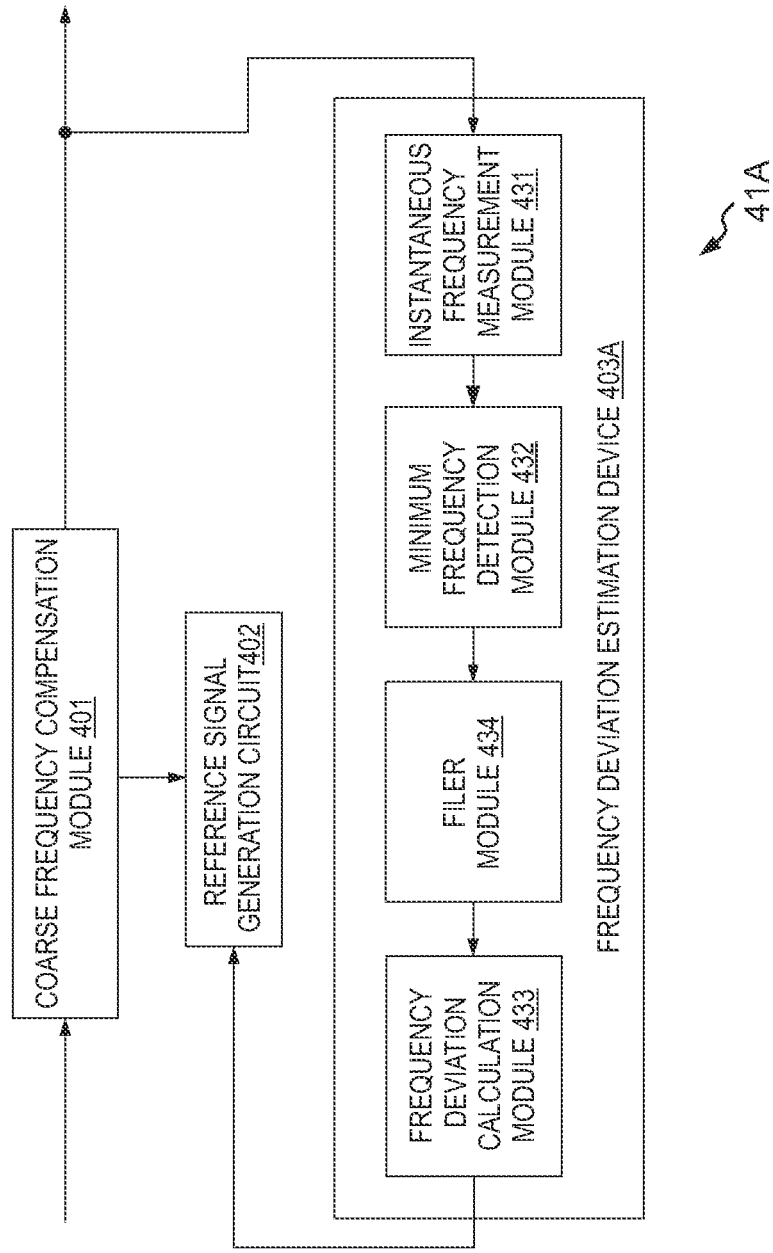
FIG. 9 illustrates a functional block diagram of the coarse frequency control module including the frequency deviation estimation device, in accordance with another embodiment of the present disclosure.

FIG. 9 illustrates a functional block diagram of the coarse frequency control module 41A including a frequency deviation estimation device 403A, in accordance with another embodiment of the present disclosure. The AIS for the ship includes the coarse frequency control module 41A which further includes the frequency deviation estimation device 403A according to FIG. 9 is different from the AIS 10 for the ship including the frequency deviation estimation device 403 according to FIG. 2. The main difference is in the configuration and processing of the coarse frequency control modules 41, and 41A and, more specifically, in the configuration and processing of the frequency deviation estimation devices 403, and 403A. Other configurations of the ship's automatic identification system according to the FIG. 9 are the same as those of the AIS 10 for the ship according to FIG. 1, and hence the description of the same modules is omitted.

The coarse frequency control module 41A is provided with a frequency deviation estimation device 403A. The frequency deviation estimation device 403A is provided with the instantaneous frequency measurement module 431, the minimum frequency detection module 432, the frequency deviation calculation module 433, and a filter module 434. In other words, the frequency deviation estimation device 403A is provided with a configuration in which a filter module 434 is added to the frequency deviation estimation device 403.

The minimum frequency of the instantaneous frequency is input to the filter module 434. The filter module 434 performs statistical filtering on the minimum frequency of the instantaneous frequency. The filter module 434 outputs the minimum frequency after filtering, to the frequency deviation calculation module 433.

More specifically, the filter module 434 calculates the minimum frequency after filtering, for example, from a moving average frequency of the minimum frequency. For example, the minimum frequency detection module 432 sets the detection target interval by further dividing it into a plurality of intervals.

The minimum frequency detection module 432 detects the minimum frequency for each of the plurality of intervals. The filter module 434 performs the moving average processing of the minimum frequency of the plurality of intervals, to calculate a plurality of moving average frequencies. The filter module 434 calculates a median of the plurality of moving average frequencies. The filter module 434 sets the median of the plurality of moving average frequencies as the minimum frequency after filtering.

The filter module 434 sets the median frequency as the minimum frequency of the filter module. In one embodiment, the minimum frequency detection module 432 sets the detection target interval by further dividing it into the plurality of intervals.

The minimum frequency detection module 432 detects the minimum frequency for each of the plurality of intervals. The filter module 434 calculates the median frequency for the minimum frequency of the plurality of intervals. The filter module 434 sets this median frequency as the minimum frequency after the filter processing.

The frequency deviation calculation module 433 uses the minimum frequency after the filter processing to calculate the frequency deviation as described above.

By having the filter module 434, the frequency deviation estimation device 403A can output the minimum frequency used for the calculation of the frequency deviation. Further, the frequency deviation estimation device 403A can suppress the influence of noise included in the measurement timing and the received signal. Thus, the frequency deviation estimation device 403A can estimate the frequency deviation more reliably and more accurately.

It should be noted that the processing in the filter module 434 is not limited to the one mentioned above, and other processing can be applied as long as it is a statistical processing that can suppress the effects of measurement timing and noise included in the received signal.

In addition, in the above explanation, the antenna 20 of the AIS signal is shown as an example, but the above configuration and processing can be applied to a signal in which non-repetitive code modulation is applied to the preamble of the received signal.

Thus, the frequency deviation estimation device can easily estimate the frequency deviation for non-repetitive signals. Moreover, the frequency deviation estimation device can estimate the frequency deviation more accurately.

DESCRIPTION OF REFERENCE CHARACTERS

10: UAIS/AIS/(Universal Shipborne) Automatic Identification System
20: Antenna
30: First Down Conversion Module (Down Converter)
41, 41A: Coarse Frequency Control Module (Coarse Frequency Controller)
42: Symbol Timing Detection Module (Symbol Timing Detector)
43: Second Down Conversion Module (Down Converter)
44: Phase Control Module (Phase Controller)
45: Frequency Tracking Module (Frequency Tracker)
51: Signal Detection Module (Signal Detector)
52: Correlation Module (Correlator)
60: Decoding Module (Decoder)
401: Coarse Frequency Compensation Module
402: Reference Signal Generation Circuit (Reference Signal Generator)
403, 403A: Frequency Deviation Estimation Device
431: Instantaneous Frequency Measurement Module
432: Minimum Frequency Detection Module (Minimum Frequency Detector)
433: Frequency Deviation Calculation Module
434: Filter Module/Filter
441: Frequency Difference Calculation Module
442: Frequency Deviation Determination Module

What is claimed is:

1. A frequency deviation estimation device, comprising: processing circuitry configured:
to measure an instantaneous frequency of a received communication signal;
to detect a minimum frequency of the instantaneous frequency;
to calculate a frequency deviation between the received communication signal and a reference signal for coarse adjustment, using the minimum frequency of the instantaneous frequency and a reference minimum frequency when the frequency deviation is zero Hertz;
to perform a filtering process by filtering the minimum frequency of a plurality of intervals; and
to calculate the frequency deviation using the minimum frequency filtered by the filtering process.

2. The frequency deviation estimation device according to claim 1, wherein the processing circuitry is further configured:
to calculate a frequency difference between the reference minimum frequency and the minimum frequency; and
to determine the frequency deviation using the frequency difference.

3. The frequency deviation estimation device according to claim 1, wherein
the processing circuitry is further configured to set a median frequency of the minimum frequency of the plurality of intervals as the minimum frequency after performing the filtering process.

4. The frequency deviation estimation device according to claim 1, wherein
the processing circuitry further is configured to calculate a plurality of moving average frequencies after performing a moving average processing on the minimum frequency of the plurality of intervals.

5. The frequency deviation estimation device according to claim 3, wherein
the processing circuitry is further configured to set a median frequency of a plurality of moving average frequencies as the minimum frequency after performing the filtering process.

6. The frequency deviation estimation device according claim 5, wherein
the processing circuitry is further configured to measure the instantaneous frequency of a preamble of the received communication signal for communication control, the preamble of the received communication signal consists of non-repetitive data.

7. The frequency deviation estimation device according to claim 2, wherein
the processing circuitry is further configured to set a median frequency of the minimum frequency of the plurality of intervals as the minimum frequency after performing the filtering process.

8. The frequency deviation estimation device according to claim 2, wherein
the processing circuitry further is configured to calculate a plurality of moving average frequencies after performing a moving average processing on the minimum frequency of the plurality of intervals.

9. The frequency deviation estimation device according to claim 8, wherein
the processing circuitry is further configured to set a median frequency of a plurality of moving average frequencies as the minimum frequency after performing the filtering process.

10. The frequency deviation estimation device according to claim 2, wherein
the processing circuitry is further configured to measure the instantaneous frequency of a preamble of the received communication signal for communication control, the preamble of the received communication signal consists of non-repetitive data.

11. The frequency deviation estimation device according to claim 1, wherein
the processing circuitry is further configured to measure the instantaneous frequency of a preamble of the received communication signal for communication control, the preamble of the received communication signal consists of non-repetitive data.

12. The frequency deviation estimation device according to claim 3, wherein
the processing circuitry is further configured to measure the instantaneous frequency of a preamble of the received communication signal for communication control, the preamble of the received communication signal consists of non-repetitive data.

13. The frequency deviation estimation device according to claim 4, wherein
the processing circuitry is further configured to measure the instantaneous frequency of a preamble of the received communication signal for communication control, the preamble of the received communication signal consists of non-repetitive data.

14. The frequency deviation estimation device according to claim 5, wherein
the processing circuitry is further configured to measure the instantaneous frequency of a preamble of the received communication signal for communication control, the preamble of the received communication signal consists of non-repetitive data.

15. A frequency deviation estimation method, comprising:
measuring an instantaneous frequency of a received communication signal;
detecting a minimum frequency of the instantaneous frequency;
calculating a frequency deviation between the received communication signal and a reference signal for coarse adjustment, using a reference minimum frequency and the minimum frequency when the frequency deviation is zero Hertz;
performing a filtering process by filtering the minimum frequency of a plurality of intervals; and
calculating the frequency deviation using the minimum frequency filtered by the filtering process.

16. The frequency deviation estimation method according to claim 15, further comprising:
calculating a frequency difference between the reference minimum frequency and the minimum frequency; and
determining the frequency deviation using the frequency difference.

17. A non-transitory computer-readable medium storing a frequency deviation estimation program configured to cause a processing unit to execute processing, the processing comprising:
measuring an instantaneous frequency of a received communication signal;
detecting a minimum frequency of the instantaneous frequency;
calculating a frequency deviation between the received communication signal and a reference signal for coarse adjustment, using a reference minimum frequency and the minimum frequency when the frequency deviation is zero Hertz;
performing a filtering process by filtering the minimum frequency of a plurality of intervals; and
calculating the frequency deviation using the minimum frequency filtered by the filtering process.

18. The non-transitory computer-readable medium according to claim 17, further comprising:
calculating a frequency difference between the reference minimum frequency and the minimum frequency; and
determining the frequency deviation using the frequency difference.

* * * * *